Figure 1:
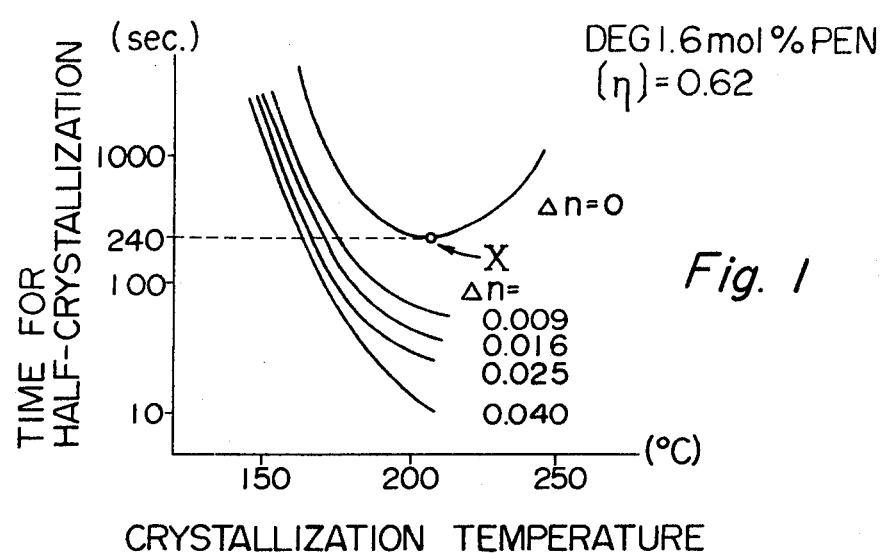

United States Patent [19]

Kuratsuji et al.

[11] 4,051,112
[45] Sept. 27, 1977

[54] POLYESTER GRANULE FOR MELT-SHAPING AND PROCESS FOR THE PREPARATION THEREOF

[75] Inventors: Takatoshi Kuratsuji; Hiroo Inata; Shoji Kawase, all of Iwakuni, Japan

[73] Assignee: Teijin Limited, Japan

[21] Appl. No.: 592,312

[22] Filed: July 1, 1975

[30] Foreign Application Priority Data

July 5, 1974 Japan ............................. 49-76416

[51] Int. Cl.$^2$ ............................................. C08G 63/70
[52] U.S. Cl. ............................... 260/75 T; 264/140; 264/141
[58] Field of Search ............... 260/75 T; 264/140, 141

[56] References Cited
U.S. PATENT DOCUMENTS

| | | | |
|---|---|---|---|
| 2,834,053 | 5/1958 | Bilanin et al. | 264/141 |
| 3,014,011 | 12/1961 | Zoetbrood | 260/75 T |
| 3,634,359 | 1/1972 | Breitschaft et al. | 260/75 T X |
| 3,728,309 | 4/1973 | Maxion | 260/75 T X |
| 3,746,688 | 7/1973 | Berkau | 260/75 T |
| 3,761,450 | 9/1973 | Herwig et al. | 260/75 T |
| 3,838,107 | 9/1974 | Lemaistre et al. | 260/75 T |
| 3,931,082 | 1/1976 | Cruz et al. | 260/75 T X |

*Primary Examiner*—Lucille M. Phynes
*Attorney, Agent, or Firm*—Wenderoth, Lind & Ponack

[57] ABSTRACT

Polyester granule for melt-shaping which is composed of a difficultly crystallizable copolyester having the minimum time for half-crystallization of at least one minute, and has the surfaces resulting from cutting by a cutter, improvement in that i. the polyester granule has an intrinsic viscosity of at least 0.55 (as measured in o-chlorophenol at 35° C.), ii. the polyester granule has in its surface portion an oriented portion having an N-value of at least 0.04, the N-value being calculated by the equation, $$N = n \cdot \lambda d$$

and iii. the inside of the polyester granule other than the said surface portion has an N-value of not higher than 0.02.

Said polyester granule can be prepared by cutting a copolyester melt-extrudate having an intrinsic viscosity of at least 0.55 under the conditions as will control the surface temperature $t$ (° C) of the extrudate to satisfy the expression $$Tg + 30° C. \geq t > Tg - 15° C.$$

5 Claims, 6 Drawing Figures

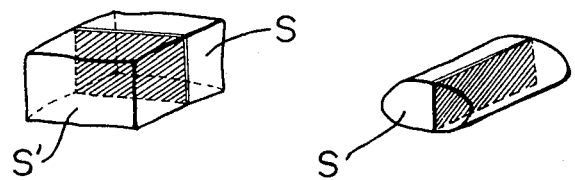
Fig. 3-A    Fig. 3-B
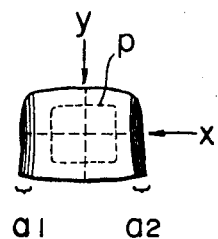   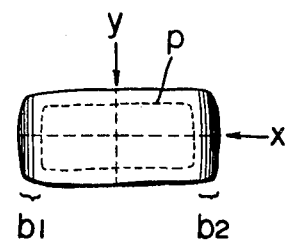
Fig. 4-A    Fig. 4-B

POLYESTER GRANULE FOR MELT-SHAPING AND PROCESS FOR THE PREPARATION THEREOF

This invention relates to a polyester granule (or chip or pellet) for melt-shaping which is prepared through the steps of melt-extruding a difficulty crystallizable copolyester into such forms as strand or sheet, for example, and cutting the substantially unoriented extrudate with a cutter and also to a process for making such granule.

More particularly, the invention provides a polyester granule for melt-shaping composed of a difficulty crystallizable copolyester, which is prepared as above and possesses surfaces formed by the cutting, the characteristic features residing in that the formation of agglomerated mass by mutual fusion of granule which is apt to take place after the cutting, for example, in the subsequent drying step, can be effectively avoided, and furthermore the degradation of physical properties of the melt-shaped articles made from granules such as transparency and strength, can be prevented; and also provides a process for the preparation thereof.

It has been a conventional practice to extrude polyester in molten state, solidify the extrudate, cut the resulting substantially unoriented, for example, strand- or sheet-formed extrudate into the desired shape and size with a cutter to form the polyester granule for melt-shaping, and to use the granules as the starting material of various shaped articles such as filaments, films, etc. In said procedure, the polyester granule inevitably contain minor amounts of water. If subjected to the melt-shaping step as they are, therefore, hydrolysis of the polyester takes place to cause qualitative degradation of the melt-shaped articles and troubles during the shaping operations. In order to avoid such, the polyester granule formed upon the cutting need be dried. However, with a polyester granule, particularly with a difficulty crystallizable copolyester granule, the objectionable phenomenon that the mutual fusion of granules takes place during the drying treatment to form an agglomerated mass or masses is conspicuous, such phenomenon in turn rendering the drying uneven or the melt-shaping operations difficult.

As a means for avoiding the agglomerated mass-formation, post-cutting partial crystallization is known, in which the granule formed upon cutting the melt-extrudate is heated to cause surfacial crystallization (for example, Japanese Official Patent Gazette, Publication No. 9817/62) or the cut granule is treated with a swelling agent to be partially crystallized (U.S. Pat. No. 3,014,011). Such post-cutting crystallization preceding the drying step is effective to avoid the agglomeration to a certain degree with the ordinary, easily crystallizable polyesters. However, the method is subject to such disadvantages as that it is time-consuming and expensive, and furthermore that the operation to achieve the partial crystallization of once granulated voluminous product to exactly the desired degree with uniformity, is quite complicated.

Particularly with difficulty crystallizable copolyester such as that requires no less than one minute as the mininum time for half-crystallization, it is extremely difficult to give the partial crystallization to such an extent as will avoid the agglomeration which is detrimental to the melt-shaping operation as well as to the physical properties of the melt-shaped articles, by such post-cutting crystallization means as above described. In fact, with the sparingly crystallizable copolyesters, it is essentially difficult to prevent the agglomerated mass-formation by the post-cutting crystallization. Also if a swelling agent is used, its removal requires cumbersome and disadvantageous operations.

There are proposals for preventing the miscutting troubles which are apt to take place in the manufacture of such difficultly crystallizable copolyester granules for melt-shaping.

One of the proposals comprises controlling the temperature of the melt-extrudate to a specific range in advance, and during the cutting of the substantially unoriented extrudate, again controlling the surface temperature of the extrudate to a specific range not higher than Tg − 15° C. (Tg standing for the second order transition temperature of the melt-extrudate) (Japanese Official Patent Gazette, Publication No. 22100/72). The other comprises first drawing the melt-extrudate in advance of the cutting, and then controlling the surface temperature of the drawn extrudate to not higher than Tg − 15° C. before subjecting the same to the cutting (Japanese Official Patent Gazette, Publication No. 22460/72). The former technique, however, fails to substantially prevent the agglomerated mass-formation when applied to such difficulty crystallizable copolyester having an intrinsic viscosity (as measured in o-chlorophenol at 35° C.) of no less then 0.55, if it can prevent the accurrence of miscutting. Whereas, the latter renders the cutting difficult because the inner portion of the extrudate is given the orientation of the extent same to that given to the surface portion thereof upon the pre-cutting drawing, which results in the occasional miscutting to form macro-granules exceeding the predetermined size. Presence of such macro-size granules causes operational troubles during the melt-shaping, such as clogging of the shaping machine. Again because the whole body of the extrudate is oriented by the drawing, the cutting edge is more apt to be worn and damaged. Furthermore, because the entire granules formed by cutting show increased crystallizing tendency during the drying step by heating, the crystals partially remain in the melt-shaped articles as failed to be completely melted during the melt-shaping procedure, which conspicuously impair the transparency which is one of the characteristics of difficulty crystallizable polyester. If the complete melting of the crystals in the melt-shaping is attempted in order to maintain the favorable transparency, the shaping must be performed at still elevated temperatures, which invites thermal decomposition of the polyester, and consequently the degradation of mechanical properties such as strength and objectionable coloring of the formed shaped articles.

In consideration of the foregoing, we engaged in extensive studies with the view to provide the polyester granule for melt-shaping from such difficulty crystallizable copolyester having the minimum time for half-crystallization of at least one minute, particularly a substantially unoriented melt-extrudate of such copolyester having an intrinsic viscosity of at least 0.55(as measured in o-chorophenol at 35° C.), which is completely free from the foregoing drawbacks. In the course of studies we discovered that, contrary to the concept of prior art, when the undrawn melt-extrudate, i.e., substantially unoriented melt-extrudate of the copolyester having an intrinsic viscosity of at least 0.55(as measured in o-chlorophenol at 35° C.) is cut under the conditions satisfactory to raise the surface temperature of the extrudate to a specific temperature range exceeding Tg − 15° C. (the definition of Tg being the same to that previously given), very appropriately oriented portion can be formed on part of the surface portion, particularly on the surface exposed upon the cutting. We furthermore discovered that the granule imparted with such appropriately oriented surface portions by such extremely simple means exhibits substantial improvement as to the defect of forming agglomerated mass during, for example, the heating in the drying step. Again, such polyester granules for melt-shaping with the appropriately oriented surface portions, although normally not the entire surfaces, and with the inside substantially unoriented or oriented to a degree considerably less than that of the appropriate orientation, are found to be completely free from the above-mentioned defect of the granule formed by cutting the drawn melt-extrudate, i.e., to appreciably impair the transparency of the shaped articles prepared therefrom. The appropriately oriented granules also are conveniently free from causing such cutting difficulties and miscutting as encountered in the prior art.

The degree of such appropriate orientation in the surface portion of the granule is confirmed to be, when expressed by the later defined N-value ($N = n\lambda/d$), preferably not less than 0.04, while the preferred N-value of the inside portion of the granule (other than said oriented surface portion) is not higher than 0.02.

Thus, a primary object of the present invention is to provide a polyester granule for melt-shaping, which is composed of a difficulty crystallizable copolyester, particularly those having an intrinsic viscosity of not less than 0.55(as measured in o-chlorophenol at 35° C.) and the minimum time for half-crystallization of at least 1 minute, and has the surfaces exposed upon cutting with a cutter; and which is free from the aforementioned various disadvantages and defects particularly conspicuous with such difficulty crystallizable copolyesters.

Another object of the invention is to provide a process for making such excellent polyester granules for melt-shaping.

The foregoing objects, and many other objects and advantages of the present invention will become all the more clear from reading the following descriptions.

The polyester granule for melt-shaping according to the invention is composed of a difficulty crystallizable copolyester having the minimum time for half-crystallization of at least 1 minute, and has the surfaces resulting from cutting by a cutter, the characteristic features residing in that i. the polyester granule has the intrinsic visocsity of at least 0.55(as measured in o-chlorophenol at 35° C.), preferably at least 0.58, inter alia, at least 0.60, ii. the polyester granule has on normally a part of the surface portions thereof the oriented portions having an N-value of at least 0.04, the N-value being calculated by the equation (1) below:

$$N = n\cdot\lambda/d \qquad (1)$$

in which $\lambda$ is the wavelength ($\mu$) of a light source used for the measurement, $n$ is the number of interference fringes caused by double refraction counted upon the observation through a polarizing microscope using the light source of the above wavelength $\lambda$, and $d$ is the thickness ($\mu$) of a sample prepared by slicing the granule to a predetermined thickness including a part of the cut surface of the granule, and p iii. the inside of the polyester granule other than the said surface portion has an N-value of not higher than 0.02.

According to the invention, the minimum time for half-crystallization is a time for half-crystallization at the temperature at which the difficulty crystallizable copolyester shows the maximum crystallization velocity when crystallized from substantially unoriented state. The time can be measured and determined as follows:

The sample granule of the difficulty crystallizable copolyester is melted by heating for 5 minutes at a temperature higher than the melting point of said copolyester by 20° C. The melt is solidified by a heat-treatment at a predetermined temperature for a predetermined time. Crystallization occurs at this time. The density of the heat-treated sample is determined with a density-gradient tube using n-hexane-carbon tetrachloride liquid mixture (ASTM D 1505). The measurement is repeated while varying the heat-treating time, to determine the density ($\rho a$) from the density ($\rho o$) of untreated sample (heat-treating time = zero) and the maximum density ($\rho$max) reached upon the primary crystallization, according to the equation below:

$$\rho a = \rho o + \rho max/2$$

Thus, the heating time required for obtaining the heat-treated sample having the density ($\rho a$) is set to be the "time for half-crystallization" of the difficulty crystallizable copolyester. The time for half-crystallization is measured with plural runs at various heat-treating temperatures (crystallization temperatures), and the minimum of the measured values is designated as the "minimum time for half-crystallization". Referring to the attached FIG. 1, for example, the minimum time for half-crystallization of the specified polyethylenenaphthalene-2,6-dicarboxylate copolymerized with 1.6 mol%. of diethylene glycol is the "time for half-crystallization" read at the minimum point (X) on the curve of $\Delta n = 0$, i.e., 240 seconds (4 minutes). With the sample used for FIG. 2, the minimum time for half-crystallization is 25 minutes.

According to the invention, the N-value ($N = n\cdot\lambda/d$) is determined as follows. Taking the case of rectangular parallelepiped granule obtained by cutting a sheet-formed melt-extrudate, for example, a thin sample piece (shown by the area filled with diagonal lines in FIG. 3-A) is sliced away from a sample granule, the sample piece being orthogonal to the surface S formed by the cutting with a cutter (with this type of sample granule, frequently the surface S' and the opposite surface also are those formed by the cutting, besides the surface opposite to S, referring also to FIG. 3-A) and approximately parallel to the other surface S'. Three of such sample pieces are cut away in parallel with the surface S' and at substantially equal intervals, but excluding the surface S'. Or, if the granule is cylindrical as obtained by cutting a strand of melt-extrudate as shown in FIG. 3-B, the thin sample piece which is orthogonal with the surface S formed upon cutting is sliced away as shown by the area filled with diagonal lines in FIG. 3-B. Three of such sample pieces substantially paralleling with each other are cut away at approximately equal intervals. The thickness ($d$) of a single sample piece is 200 – 500 $\mu$. The sample piece is fixed at the prescribed position of a polarizing microscope at a magnification of 100×, and exposed to the light from the prescribed light source. The microscopic observation then reveals the formation of interference fringes, $a_1$, $a_2$, $b_1$ and $b_2$ as shown in FIG. 4-A (the sample from rectangular parallelepiped granule) and FIG. 4-B (the sample from cylindrical granule) at the oriented portions. The respective number ($n$) of the interference fringes is counted, and the N-value is calculated from the wavelength ($\lambda$) of the light used as the light source, the sample thickness ($d$) and the number of interference fringes ($n$), according to the equation (1) below:

$$N = n \cdot \lambda / d \qquad (1)$$

As the light source, for example, D-line of sodium (0.589 $\mu$) can be used. The N-value is determined as to all of the three sample pieces, and the maximum of the three is set to be the N-value of the specific granule. In the example demonstrated by FIG. 4, the interference fringes due to orientation are observed only at the surface portions formed by cutting, but there are occasions in which the interference fringes sparcely appear also on the inside portion. According to the invention, preferably the N-value at the surface portions should be no less than 0.04, and that of the inside portions should not exceed 0.02 if not zero. Incidentally, the "surface portion" denotes the peripheral portion from the outermost surface to not more than one-fifth the distance $n$ or $y$ toward the inside of the granule (the limit shown by line $p$), as indicated in FIG. 4 showing the faces of the sample pieces. The greater N-value signifies the higher degree of orientation.

The polyester granule for melt-shaping according to the invention has the intrinsic viscosity of at least 0.55 as specified in the characteristic feature (i). Also as defined by the feature (ii), the granule possesses at its surface portion the oriented portions having the N-value of at least 0.04, preferably at least 0.05, and the inside portion (other than the surface portion) having the N-value of no more than 0.02, preferably no more than 0.01. When the N-value of the surface portion is less than 0.04, the granules' tendency to form agglomerated mass cannot be eliminated. Whereas, when the N-value of inside portion exceeds 0.02, particularly as it approaches that of the surface portion, the transparency and mechanical properties of the melt-shaped articles prepared from the granules are appreciably adversely affected, as in the case of prior art cutting the drawn melt-extrudate as already explained.

Figure 2:
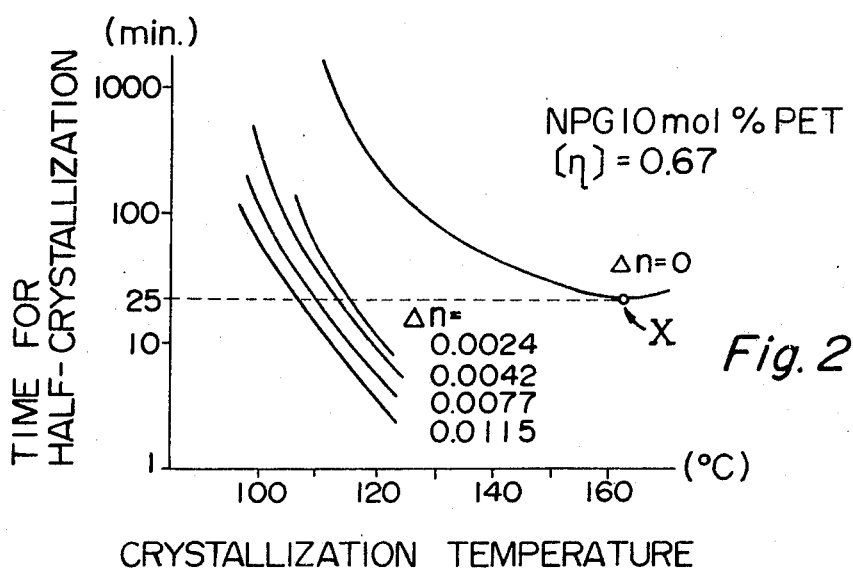

With the difficulty crystallizable copolyesters having the minimum time for half-crystallization of at least 1 minute to be employed in the invention, there is observed a phenomenon, similarly to the cases of easily crystallizable polyester, that the higher is the degree of orientation of the polyester granules, the greater is its crystallization velocity. Such phenomenon is demonstrated also in the examples shown in the attached FIGS. 1 and 2. FIG. 1 shows the above correlation as to the polyethylene-naphthalene 2,6-dicarboxylate copolymerized with 1.6 mol% of diethylene glycol (minimum time for half-crystallization = 4 minutes), as indicated on the $\Delta n = 0$ curve in FIG. 1). FIG. 2 shows the similar correlation as to polyethylene terephthalate copolymerized with 10 mol% of neopentylene glycol (minimum time for half-crystallization = 25 minutes, as indicated on the $\Delta n = 0$ curve in FIG. 2). As can be understood from the named drawings, with the increase in $\Delta n$ value, the time for half-crystallization at the same crystallization temperature decreases, and also the minimum time for half-crystallization is shortened. The granules formed by cutting the substantially unoriented melt-extrudate under the conditions as would satisfy the specific surface temperature requirement according to the invention are appropriately oriented only at the surface portions thereof (normally at parts of the surface areas) and their inside portions are substantially unoriented. Consequently, as shown in FIGS. 1 and 2, at the surface portion only the crystallization velocity under heating becomes great. We presume, therefore, with the granule of the invention the surface portion only is crystallized under heating, which effectively contributes to avoid the formation of agglomerated mass by the heat exerted, for example, during the drying or other occasions after the cutting.

It is indeed surprising that such appropriate degree of orientation at only the surface portion which produces the advantageous results as above-described can be imparted by such simple and advantageous means as cutting the substantially unoriented melt-extrudate under the conditions satisfactory to make the surface temperature of the extrudate fall within a specific temperature range.

According to the present invention, based on the above unexpected discovery, a process for making the polyester granules for melt-shaping is provided, which comprises cutting a substantially unoriented melt-extrudate of a difficulty crystallizable copolyester having the minimum time for half-crystallization of at least 1 minute with a cutter, the characteristic feature residing in that said polyester melt-extrudate has an intrinsic viscosity of at least 0.55(as measured in o-chlorophenol at 35° C.), and the cutting of the extrudate is performed under the conditions as will control the surface temperature $t$ (°C.) of the extrudate to satisfy the expression (2) below:

$$Tg + 30°0\ C.\ 24\ t > Tg\ 31\ 15°\ C. \qquad (2)$$

in which Tg stands for the secnd order transition temperature (°C.) of the extrudate.

Incidentally, said second order transition point Tg is measured with a Perkin-Elmer DSC-1 model, with the temperature raising rate of 10° C./min.

The above process can be practiced in various manners satisfying the above condition. In a preferred embodiment, during the cutting of the substantially unoriented melt-extrudate with a cutter to form granules, the surface temperature of the extrudate is controlled to satisfy the foregoing expression (2), preferably the expression (2)' below:

$$Tg + 20°\ C. \geq t > Tg - 15°\ C. \qquad (2)'$$

(in which Tg has the previously given definition).

The controlling of the surface temperature can be effected, for example, by such means as passing the substantially unoriented melt-extrudate to be cut, thrugh a bath of liquid or gaseous cooling medium controlled to a suitable temperature.

Obviously, the specified process can be practiced by other means. For example, during the cutting of the extrudate with a cutter, the cutting edge may be heated to transfer the heat to the surface portions of the extrudate coming into contact with said edge, so as to raise said surface temperature to satisfy the expression (2), preferably the expression (2)'. Thus, the object of the invention can be achieved by maintaining the temperature $t$ of the cutter edge within the range specified by $Tg + 30°$ C. $\geq t > Tg - 30°$ C., preferably $Tg + 20°$ C. $\geq t > Tg - 20°$ C., during the cutting. In that occasion, it is convenient to control the surface temperature of the extrudate to be cut within the range of from $0°$ C. to $Tg + 30°$ C. Or, if desired, a heating roller may be used to heat the surface alone of the extrudate to a temperature falling within the range specified by the expression (2), preferably the expression (2)', under the conditions as will not cause the substantial rolling effect to reach the inside portion of the extrudate to induce substantial orientation at the inside (such as that causing the N-value to exceed 0.02), preceding the cutting. From the standpoints of operational ease, simple equipment and easy controlling, the first-mentioned embodiment is the most preferred. According to the subject process, due to the shear caused by the cutting under the specified temperature condition, the sectional surface exposed by the cutting and the vicinity thereof become the appropriately oriented portions.

In the process of this invention, if the cutting is performed under the temperature conditions failing to satisfy the foregoing expression (2), e.g., at a temperature lower than $Tg - 15°$ C., the intended appropriate degree of orientation cannot be achieved. Or, if the temperature exceeds $Tg + 30°$ C., the molecules once appropriately oriented are disturbed, to fail to provide the granule having the surface portions appropriately oriented.

The minimum time for half-crystallization of the difficulty crystallizable copolyester to serve as the starting material of the subject process should be at least 1 minute, preferably at least 3 minutes, inter alia, at least 5 minutes. Specific examples of such copolyester include polyethylene terephthalate containing as copolymerized therewith, no less than 2 mol%, preferably 2 – 50 mol%, inter alia, 5 – 40 mol%, of the third component, polyethylenenaphthalene-2,6-dicarboxylate copolymerized with at least 0.6 mol%, preferably 0.8 – 50 mol%, inter alia, 1 – 40 mol%, of a third component, and the like. As the third component, for example, (a) dicarboxylic acids such as naphthalenedicarboxylic acid (excluding 2,6-naphthalenedicarboxylic acid when the main acid component is naphthalene-2,6-dicarboxylic acid), terephthalic acid (not when the co-polyester is a co-polymer of polyethylene terephthalate), isophthalic acid, methyl terephthalic acid, diphenyldicarboxylic acid, diphenoxyethanedicarboxylic acid, diphenylsulfonedicarboxylic acid, adipic acid, sebacic acid, hexahydroterephthalic acid, and the like; (b) oxy acids such as p-hydroxybenzoic acid, p-hydroxyethoxybenzoic acid, and the like; and (c) diols such as neopentylene glycol, tetramethylene glycol, hexamethylene glycol, cyclohexane dimethanol, diethylene glycol, 2,2-bis(4-$\beta$-hydroxyethoxyphenyl)propane, 4,4'-bis($\beta$-hydroxyethoxy)diphenylsulfone, and the like, may be used.

Hereinafter the invention will be more specifically explained with reference to the following Examples, in which the agglomeration ratio is measured as follows: the sample cut granules as uniformly packed in a vessel with wire-net bottom to a depth of 5 cm are dried by heating in a hot air-current dryer, and the percentile weight ratio of the thereupon formed agglomerated mass to the total granules is made the agglomeration ratio. The temperature of the surface portion of extrudate was measured with a thermocouple-type surface temperature measuring apparatus HP-4F (product of Adachi Keiki K.K., Japan).

EXAMPLES 1 – 4 AND CONTROLS 1 – 3

Polyethylene terephthalate copolymerized with 10 mol% of neopentylene glycol ($Tg = 67°$ C., intrinsic viscosity as measured in o-chlorophenol at $35°$ C. = 0.67, minimum time for half-crystallization = 2.5 minutes) was extruded from the polymerization vessel into sheet form to provide a substantially unoriented, sheet-formed extrudate. The surface temperature of the sheet was varied by changing the cooling temperature of the extrudate, and each sheet was cut into $4 \times 4 \times 2$ mm-size granules with a two-stage cutter effecting first the longitudinal cutting and then the transverse cutting. The N-values at the surface portion and inside portion, and the agglomeration ratio of the granules resulted from an hour's heating at $120°$ C. were as given in Table 1 below.

Table 1

| Example No. | Surface Temp. of Sheet (° C.) | N-value of Inside Portion of Granule | N-value of Surface Portion of Granule | Agglomeration Ratio of Granule (%) |
| --- | --- | --- | --- | --- |
| Control 1 | 40 | 0.003 | 0.029 | 23 |
| Control 2 | 50 | 0.003 | 0.035 | 16 |
| Example 1 | 54 | 0.003 | 0.055 | 4 |
| Example 2 | 85 | 0.003 | 0.080 | 2 |
| Example 3 | 89 | 0.003 | 0.068 | 5 |
| Example 4 | 95 | 0.004 | 0.042 | 9 |
| Control 3 | 99 | 0.003 | 0.020 | 48 |

EXAMPLE 5

Polyethylenenaphthalene-2,6-dicarboxylate copolymerized with 1.6 mol% of diethylene glycol ($Tg = 111°$ C., intrinsic viscosity as measured in o-chlorophenol at $35°$ C. = 0.62, minimum time for half-crystallization = 4 minutes) was extruded from the polymerization vessel into sheet form, and passed through a $90°$ C. aqueous bath to be solidified. Thus obtained substantially unoriented extrudate was cut into granules with the same cutter as that used in Example 1. The surface temperature of the sheet under cutting was $98°$ C. The resulting granules had uniform shape and dimensions, the miscutting being substantially nil (content of miscut granules = 4%). The N-value at inside of the granule was 0.004, and that at the surface portion of the granule was 0.050. When the granules were dried at $120°$ C. for an hour, the agglomeration ratio was only 2%. When the granules were melt at $290°$ C. and extrusion-molded, shaped articles of excellent transparency were obtained.

CONTROL 4

Example 5 was repeated except that the molten polymer extruded into sheet form was rolled by $1.6 \times$ with a press roller before it was passed through the $90°$ C. aqueous bath. The granules formed upon cutting had the inside N-value of 0.047, and surface N-value of 0.049, i.e., the entire granules were oriented. The granules had non-uniform shapes and dimensions, the content of miscut granules reaching as high as 20%. The agglomeration after the similar drying to that of Example 5 was 1.8%, but during the subsequent melt-shaping procedure the extruder was frequently clogged by the un-melted granules caused by the non-uniform dimensions of the granules, and smooth extrusion-molding could not be performed. Also the resulting shaped articles contained minor amount of residual crystals, and consequently showed opaque. Accordingly, the melting temperature of the melt-shaping was raised to 320° C. to completely melt the crystals for improving the transparency of shaped articles. Whereupon the transparency was improved, but thermal decomposition of the polymer took place, and the shaped articles were colored and exhibited inferior strength properties.

EXAMPLES 6 – 9 AND CONTROLS 5 – 6

The sample polymer as used in Example 5 was extruded into belt-form from the polymerization vessel and immediately cooled with water to room temperature to provide a substantially unoriented extrudate. The belt-formed extrudate was cut into 3 × 3 × 2 mm-size granules with a cutter which accommodated a heater inside its rotary edge to allow optional control of the edge temperature. The cutting was effected at various edge temperatures as indicated in Table 2 below. The N-values at the inside and surface portions of the granules, and the agglomeration ratio of the granules after an hour's heating at 120° C., are also shown in Table 2.

Table 2

| Example No. | Edge Temperature (° C.) | N-value of Inside Portion of Granule | N-value of Surface Portion of Granule | Agglomeration Ratio of Granule (%) |
|---|---|---|---|---|
| Control 5 | 79 | 0.003 | 0.029 | 45 |
| Example 6 | 83 | 0.003 | 0.041 | 9 |
| Example 7 | 93 | 0.003 | 0.068 | 2 |
| Example 8 | 129 | 0.003 | 0.075 | 4 |
| Example 9 | 139 | 0.003 | 0.048 | 8 |
| Control 6 | 143 | 0.003 | 0.029 | 50 |

Thus dried granules were melted at 290° C. and extrusion molded. The granules of Controls 5 and 6 caused clogging of the extruder due to the presence of agglomerated mass, but those of Examples 6 through 9 caused none of such troubles, and provided the shaped articles of excellent transparency.

EXAMPLE 10

A polyethylene terephthalate copolymer with 15 mol% of isophthalic acid copolymerized therewith ($Tg$ = 66° C.; inherent viscosity 0.71; minimum time for half-crystallization 27 minutes) was extruded from a polymerization vessel into a cooling tank in the form of a strand with a diameter of about 3 mm to form a substantially unoriented molten extrudate. When the surface temperature of the strand reached 75° to 80° C., it was cut into granules each having a length of 4 mm. The resulting granules had an N-value of 0.003 in their inside portions and 0.060 in their surface portions. When the granules are dried at 120° C. for 1 hour, they showed an agglomeration ratio of only 3%.

We claim:

1. Polyester granule for melt-shaping which is composed of a difficultly crystallizable copolyester having a minimum time for half-crystallization of at least 1 minute, and having surfaces resulting from cutting by a cutter, wherein:

i. said polyester granule has an intrinsic viscosity of at least 0.55 (as measured in o-chlorophenol at 35° C), ii. said polyester granule has on its surface an oriented portion having an N-value of at least 0.04, the N-value being calculated by equation (1):

$$N = n\lambda/d \quad (1)$$

in which $n$ is the number of interference fringes caused by double refraction counted upon the observation through a polarizing microscope using a light source of the wavelength $\lambda$ (microns), and $d$ is the thickness (microns) of a sample prepared by slicing the granule to a predetermined thickness including a part of the cut surface of the granule and iii. the inside of the polyester granule other than the said surface portion has an N-value of not higher than 0.02, said cutting being performed under conditions which will control the surface temperature $t$ (° C) of the extrudate to satisfy equation (2):

$$Tg + 30° C \geq t > Tg - 15° C \quad (2)$$

in which Tg is the second order transition temperature (° C) of the extrudate.

2. The polyester granule for melt-shaping according to claim 1, in which the difficultly crystallizable copolyester is selected from the group consisting of polyethylene terephthalate copolymerized with 2 – 50 mol% of a third component and polyethylene naphthalene-2,6-dicarboxylate copolymerized with 0.6 – 50 mol% of a third component.

3. The polyester granule for melt-shaping according to claim 1, in which the third component is selected from the group consisting of naphthalenedicarboxylic acid (excluding naphthalene-2,6-dicarboxylic acid when the copolyester is copolymerized polyethylene-2,6-naphthalate), terephthalic acid (not when the copolyester is copolymerized polyethylene terephthalate), isophthalic acid, methylterephthalic acid, diphenyldicarboxylic acid, diphenoxyethanedicarboxylic acid, diphenylsulfonedicarboxylic acid, adipic acid, sebacic and, hexahydroterephthalic acid, p-hydroxybenzoic acid, p-hydroxyethoxybenzoic acid, neopentylene glycol, tetramethylene glycol, hexamethylene glycol, cyclohexane dimethanol, diethylene glycol, 2,2-bis(4,β-hydroxyethoxyphenyl)propane and 4,4'-bis(β-hydroxyethoxy) diphenylsulfone.

4. A process for making polyester granules for melt-shaping which comprises cutting a substantially unoriented melt-extrudate of a difficultly crystallizable copolyester having a minimum time for half-crystallization of at least 1 minute with a cutter, wherein said polyester melt-extrudate has an intrinsic viscosity of at least 0.55 (as measured in o-chlorophenol at 35° C.) and the cutting of the extrudate is performed under conditions which will control the surface temperature $t$ (° C.) of extrudate to satisfy the expression (2) below:

$$Tg + 30° C. \geq t > Tg - 15° C. \quad (2)$$

in which Tg is the second order transition temperature (° C.) of the extrudate.

5. The process according to claim 4, in which the surface temperature of the extrudate under cutting satisfies the expression (2)' below:

$$Tg + 20° C. \geq t > Tg - 15° C. \quad (2)'$$

in which Tg is the second order transition temperature (° C.) of the extrudate.